N. GRAY, Jr.
FEEDING AND SPACING MECHANISM FOR CUTTING MACHINES.
APPLICATION FILED SEPT. 19, 1912.
1,099,174. Patented June 9, 1914.
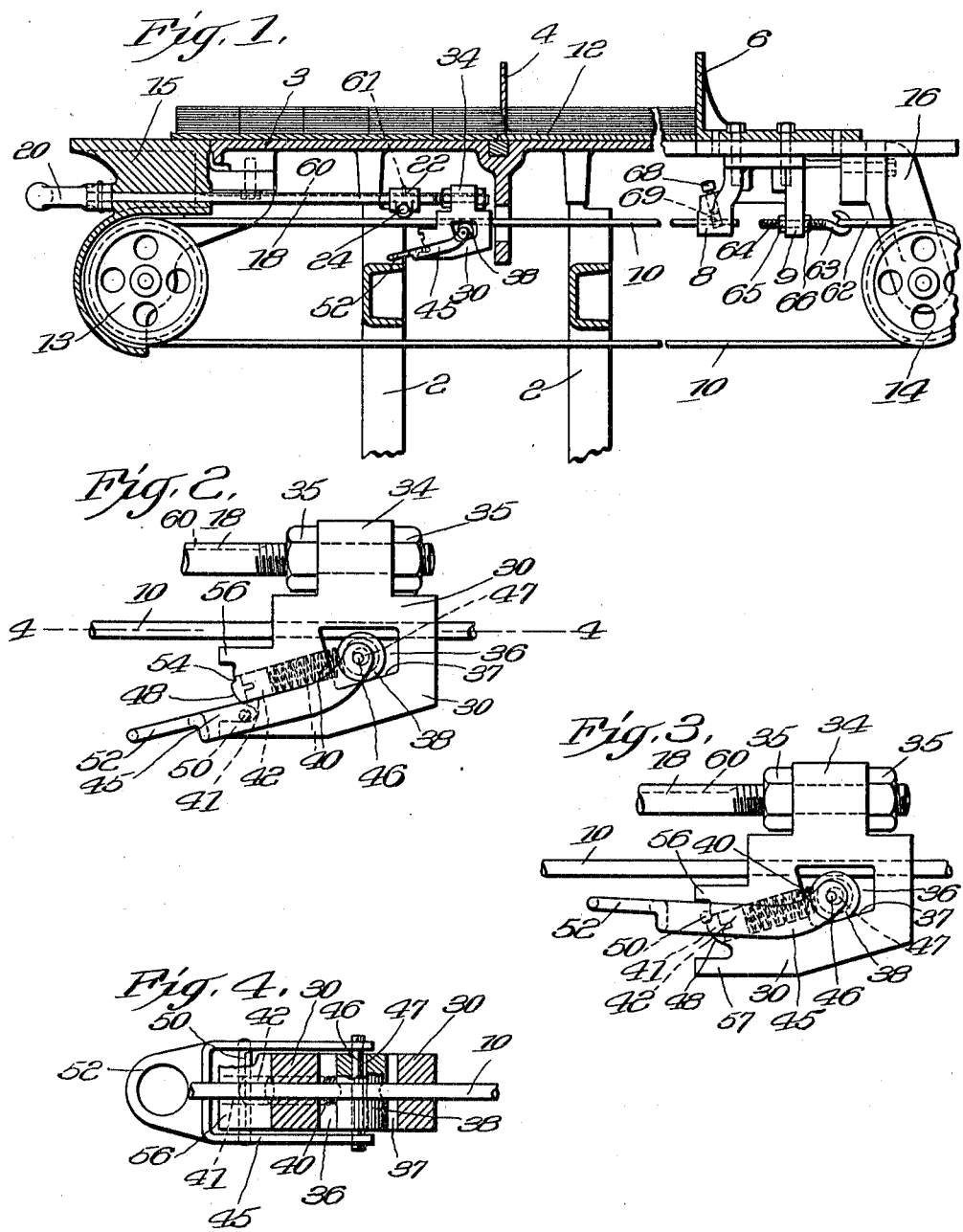

UNITED STATES PATENT OFFICE.

NIEL GRAY, JR., OF OSWEGO, NEW YORK.

FEEDING AND SPACING MECHANISM FOR CUTTING-MACHINES.

1,099,174.

Specification of Letters Patent.

Patented June 9, 1914.

Application filed September 19, 1912. Serial No. 721,179.

*To all whom it may concern:*

Be it known that I, NIEL GRAY, Jr., a citizen of the United States, residing at Oswego, in the county of Oswego and State of New York, have invented new and useful Improvements in Feeding and Spacing Mechanism for Cutting-Machines, of which the following is a specification.

This invention relates to a feeding and spacing mechanism adapted for the feeding forward of the stock to be cut in a cutting machine into pieces of small dimensions such as the samples of cloth and other materials customarily distributed to the trade by large commercial houses.

My invention is devised to accomplish a progressive feeding forward, a few inches for each cut, of the stock to the knife thereby to permit of rapidly cutting up large quantities with economy in the labor required.

Furthermore my improved mechanism is designed to insure of accurate feed movements being imparted to the work and to permit of easily adjusting the extent of such movements and to provide for the convenient return of the parts to rearward position.

The improved mechanism of my invention may readily be embodied in any type of cutting machine and in the accompanying drawing is illustrated in connection with a paper cutting machine of usual type and the reference numerals of this description indicate corresponding parts in all the views.

Figure 1 is a partial cross-sectional view of a cutting machine having my improved feeding mechanism associated therewith and shown in elevation. Fig. 2 is an enlarged elevation of the gripping parts of my device with the parts in gripping position. Fig. 3 is a similar view with the parts in released position and Fig. 4 is a horizontal sectional view on lines 4—4 of Fig. 2.

In Fig. 1 I have shown in cross section the standards 2—2 of a cutting machine upon which is supported the table 3 for the work to be cut by the knife 4 which is arranged to descend vertically to the table during the cutting stroke in the customary manner. The work to be cut is placed upon the table to the rear of the knife and is advanced to pass forwardly under the knife by a rear gage 6 arranged to slide on the table rear portion. For the advancement of the gage and the work the gage is provided with depending attachment lugs 8—9 having attached thereto the ends of the cable 10 of the feeding mechanism whereby movement is imparted to the gage to cause it to move with relation to the knife. In its movement the gage is guided by a suitable guide slot in the table, not shown, which is of a well known construction in this type of machine.

A particularly convenient and desirable manner of handling the stock to be cut into such small pieces is afforded by placing the lengths of material upon a series of conveniently sized rectangular cutting boards 12—12 desirably of stiff board and adjusting the knife so as to cut the material but not to sever the boards, whereby the stock is first cut into strips and the strips on each board may be turned as a unit with the board to be then cut into a number of small sample pieces. The table for the work is of course extended rearwardly to any extent that is desirable.

The cable 10 here shown to control the movement of the gage and work is supported by front and rear idler wheels 13 and 14 journaled in the brackets 15 and 16 bolted respectively to the front and to the rear of the table 3. These idlers are desirably circumferentially grooved to receive the cable but it will be readily understood that in place of the cable of circular cross section shown, any suitable connection may be made to the gage such as a flat steel tape, a chain or a rod.

For operating the cable to advance the work in the embodiment of my invention here shown I have provided a desirable arrangement consisting of a pull rod 18 fitted to slide in a bearing in the front bracket 15 and having fixed on its front end a handle 20. At the rear end of the pull rod provision is made for a direct connection to the cable when the rod is moved in a forward direction only so that the forward or feed movement of the rod will be communicated directly to the gage. A particularly desirable form of directly connecting the rod and cable forms an important part of the present invention and is hereinafter described.

To control the movement of the operating rod an adjustable split stop-collar 22 is fitted to slide on the rod 18 to be fixed in adjusted position thereon by a retaining nut 24. By this arrangement the movement of the rod will be limited by the engagement of the shoulder of the handle 20 with the front of the bracket 15 on the rearward movement and by the engagement of the front of the stop collar 22 with the rear face of the bracket 15 on the forward movement of the rod. Thus by pulling the handle forward from the front face of the bracket 15 the distance of the desired feed movements to be given to the work and then setting the adjustable collar 22 in engagement with the bracket rear face and securing it by the retaining nut 24 the successive feed movements will be so limited and may be accurately duplicated for each cut.

The form of connecting device shown to couple the rod and cable to move together on the forward movement is of simple and substantial construction and comprises a coupling or wedge frame 30 apertured to receive the cable upon which it slides in its movement with the pull-rod 18 to which it is connected by an integral ear 34 fitted to the rod and secured by the engagement therewith of the retaining nuts 35—35 on each side of the ear. As shown, the coupler-frame is formed with an aperture 36 providing an inclined surface 37 and exposing a portion of the cable to be engaged by a binding roller 38. Said roller is arranged within the aperture and interposed between the cable and the inclined surface 37 so as to effect a positive binding of the frame and the cable on the forward movement of the rod 18 and frame by its wedging action within the smaller end of the aperture 36. This roller is desirably grooved partially to fit the cable and normally it is forced into wedging position by a spring 40 within a recess 41 in the frame. The tension of this spring 40 is controlled by a screw-plug 42 as shown.

From the foregoing and by reference to Figs. 2 and 3 it will be understood that on the forward movement of the frame 30 the roller 38 will bind under the action of the inclined surface 37 to tightly clamp the cable between itself and the upper wall of the cable aperture thereby coupling the frame and cable to move together. On the rearward movement of the frame the roller 38 will be caused to ride down the inclined surface toward the larger end of the aperture 36 against the action of the spring 40 releasing the frame so as to slide freely on the cable in its return movement but to take a renewed grip on the cable immediately on the succeeding forward movement.

To permit the return of the gage to rearward position or of its being otherwise moved independent of the mechanism described I provide for temporarily rendering the binding roller inoperative. For this purpose a release stirrup 45 is arranged to straddle the frame and is fitted with a pin 46 on its forward end passing through the slot 47 in the roller whereby when it is pulled rearwardly it will move the roller into the released position of Fig. 3. The forward face of the frame is formed as shown with an inclined cam surface 48 engaged by a pin 50 on the stirrup to cause the stirrup when raised to pull the roller forwardly out of engagement with the cable, compressing the spring as shown in Fig. 3. A forwardly projecting handle 52 is formed on the stirrup for the movement of the stirrup into this raised or release position or for lowering it into the position of Fig. 2 when the roller is free to be under the influence of spring 40.

A small shoulder 54 is provided on the frame front face over which the pin 50 snaps to retain the stirrup in its forward or release position against the action of the spring, and upper and lower projections 56 and 57 are formed on the frame to limit the movement of the stirrup. In this position (Fig. 3) the back gage may be moved either forward or back by any means desired as the roller 38 can not then grip the cable which is free to move independently.

Other details of construction here shown consists in forming an elongated key-way 60 in the pull-rod 18 into which a pin 61 of the stop collar 22 is fitted for the purpose of preventing the collar turning on the rod. The cable is attached to the gage lugs by having one end looped at 62 to engage a hook 63 having a threaded shank 64 passing through the lug and held by lock-nuts 65—66 whereby the cable is drawn taut. The other cable end is inserted in a hole in the lug 8 and there held by a set screw 68 securing the cable through an interposed brass plug 69 so as not to break the strands of the cable. The slot 47 in the roller 38 is of larger diameter than the pin 46 passing therethrough so that it will more freely assume its correct position.

By the mechanism here described the forward or feed movements of the operating rod, as measured by the adjustment of the collar 22, are accurately transmitted to the gage and the work, this being insured by the instantaneous coupling of the frame and cable by the binding roller under the action of the spring which permits of no lost motion.

Having described my invention I claim,

1. A feeding and spacing mechanism for machines of the character described, comprising a movable gage to advance the work, a forwardly extending connection from the gage, an operating rod arranged to be reciprocated in a direction parallel to said connection and means operative to couple the connection and the operating rod on the forward movement of the rod thereby to advance the gage, said means being adapted to permit an independent return movement of the rod.

2. A feeding and spacing mechanism for machines of the character described comprising a movable gage to advance the work, a forwardly extending connection from the gage, a coupling member supported to slide on said connection, and an operating rod arranged to be reciprocated parallel to said connection and having the coupling member secured thereto, and said coupling member being adapted to couple the connection and the operating rod to be moved together on the forward movement of the rod.

3. A feeding and spacing mechanism for machines of the character described comprising a movable gage to advance the work, a forwardly extending connection from the gage, a coupling member supported to slide on said connection, an operating rod arranged to be reciprocated parallel to said connection and having the coupling member secured thereto, said coupling member being adapted to couple the connection and the operating rod to be moved together on the forward movement of the rod and an adjustable stop on the operating rod to limit the feed movements.

4. A feeding and spacing mechanism for machines of the character described, comprising a movable gage to advance the work, a forwardly extending connection from the gage, a coupling frame slidable longitudinally of the connection, an operating rod secured to the coupling frame whereby it is reciprocated and a binding element arranged within the frame to cause the coupling of the frame and connection to be moved together on the forward movement of the rod.

5. A feeding and spacing mechanism for machines of the character described, comprising a movable gage to advance the work, a forwardly extending connection from the gage, a coupling frame slidable longitudinally of the connection, an operating rod secured to the coupling frame whereby it is reciprocated, a binding element arranged within the frame to cause the coupling of the frame and connection to be moved together on the forward movement of the rod and a releasing handle connected to said binding element for the withdrawal of said element from operative position.

6. A feeding and spacing mechanism for machines of the character described comprising a movable gage, a connection forwardly extending from the gage, an operating rod arranged to reciprocate parallel to the gage connection, a coupling frame attached to said rod, a surface on said frame being inclined with relation to the gage connection, a binding element interposed between the inclined surface and the gage connection and a spring arranged normally to force the binding element into wedging position to couple the frame and connection to move together when the frame is moved in one direction.

7. A feeding and spacing mechanism for machines of the character described comprising a movable gage to advance the work, a forwardly extending connection from the gage, a coupling frame supported to slide on said connection, an operating rod supported to be reciprocated parallel to said connection and having the coupling frame secured thereto, said coupling frame being formed with an aperture providing a surface inclined with relation to the gage connection, a binding roller interposed between said inclined surface and the gage connection to effect the coupling of said frame and connection to move together when the frame is moved in one direction and a spring arranged within the coupler frame normally to force the binding roller into binding position.

8. A feeding and spacing mechanism for machines of the character described comprising a movable gage to advance the work, a forwardly extending connection from the gage, a coupling frame supported to slide on said connection, an operating rod supported to be reciprocated parallel to said connection and having the coupling frame secured thereto, said coupling frame being formed with an aperture providing a surface inclined with relation to the gage connection, a binding roller within the aperture interposed between the inclined surface and the gage connection to effect the coupling of said frame and connection to move together when the frame is moved in one direction, a spring arranged within the coupler frame normally to force the binding roller into binding position, a release handle attached to said roller, a retaining shoulder on the frame and an opposing projection on the release handle to engage said shoulder so as to retain the roller in inoperative position.

9. A feeding and spacing mechanism for machines of the character described comprising a movable gage to advance the work, pulley wheels suitably journaled, a flexible connection carried on said pulleys and connected to the gage, a coupling frame supported to slide on said connection, an operating rod supported to be reciprocated parallel to said connection and having the coupling frame secured thereto, said coupling frame being formed with an aperture providing a surface inclined with relation to the gage connection, a binding roller within the aperture interposed between the inclined surface and the gage connection to effect the coupling of said frame and connection to move together when the frame is moved in one direction, a spring arranged within the coupler frame normally to force the binding roller into binding position, a release handle attached to said roller, a retaining shoulder on the frame, an opposing projection on the release handle to engage said shoulder so as to retain the roller in inoperative position and opposed stops in the frame to limit the movement of the release handle.

10. A feeding and spacing mechanism for machines of the character described, comprising a movable gage to advance the work, a forwardly extending connection from the gage, an operating rod arranged to be reciprocated in a direction parallel to said connection, means operative to couple the connection and the operating rod to move together on the forward movement of the rod to advance the gage said means being adapted to permit an independent return movement of the rod and releasing means adapted to render the coupling means inoperative thereby to release the gage connections.

In testimony whereof I have signed my name to this specification in the presence of two subscribing witnesses.

NIEL GRAY, Jr.

Witnesses:
JAS. P. KANE,
GEORGE STONE.

Copies of this patent may be obtained for five cents each, by addressing the "Commissioner of Patents, Washington, D. C."